US009852628B2

(12) United States Patent
Hakeem et al.

(10) Patent No.: US 9,852,628 B2
(45) Date of Patent: Dec. 26, 2017

(54) VACANT PARKING SPOT NOTIFICATION

(71) Applicant: Ford Global Technologies, LLC, Dearborn, MI (US)

(72) Inventors: Mohannad Abdullah Hakeem, Dearborn, MI (US); Ebrahim Nasser, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/806,086

(22) Filed: Jul. 22, 2015

(65) Prior Publication Data

US 2017/0025009 A1 Jan. 26, 2017

(51) Int. Cl.

*B60Q 1/48* (2006.01)
*G08G 1/14* (2006.01)
*G08G 1/00* (2006.01)

(52) U.S. Cl.

CPC ............. *G08G 1/144* (2013.01); *G08G 1/143* (2013.01); *G08G 1/146* (2013.01); *G08G 1/205* (2013.01)

(58) Field of Classification Search

CPC ....... H04W 84/18; G08G 1/144; G08G 1/146; G08G 1/142; G08G 1/143; G08G 1/205; G01S 5/0289; G07B 15/02; H04L 61/2038

USPC .... 340/932.2, 933, 988, 990, 995.1, 995.17, 340/994

See application file for complete search history.

(56) References Cited

U.S. PATENT DOCUMENTS

| | | | | |
|---|---|---|---|---|
| 5,416,700 | A * | 5/1995 | Bates | F16H 61/0248 192/3.3 |
| 6,147,626 | A * | 11/2000 | Sakakibara | G01C 21/28 33/356 |
| 6,377,173 | B1 | 4/2002 | Desai | |
| 6,853,853 | B1 | 2/2005 | Van Wiemeersch et al. | |
| 7,239,252 | B2 * | 7/2007 | Kato | G08G 1/146 340/426.16 |
| 7,834,778 | B2 | 11/2010 | Browne et al. | |
| 8,427,342 | B2 | 4/2013 | Busch | |
| 8,451,087 | B2 | 5/2013 | Krishnan et al. | |
| 8,594,616 | B2 | 11/2013 | Gusikhin et al. | |
| 9,002,536 | B2 | 4/2015 | Hatton | |
| 2003/0162536 | A1 | 8/2003 | Panico | |
| 2005/0195095 | A1 | 9/2005 | Kato | |

(Continued)

FOREIGN PATENT DOCUMENTS

| | | |
|---|---|---|
| JP | 2008269358 | 11/2008 |
| WO | 2008132520 | 11/2008 |
| WO | 2015059691 | 4/2015 |

OTHER PUBLICATIONS

Delot, Thierry et al., Sharing With Caution: Managing Parking Spaces in Vehicular Networks, Mobile Information Systems, vol. 9, Issue 1, 2013, 35 pages, France.

(Continued)

*Primary Examiner* — Anh V La
(74) *Attorney, Agent, or Firm* — Frank MacKenzie; Brooks Kushman P.C.

(57) ABSTRACT

A vacant parking spot notification system for a vehicle includes a controller that, in response to receiving a user initiated signal indicative of the user's intent to cause a parked vehicle to vacate a parking spot and confirmation that operating parameters reflective of vehicle departure are present, broadcasts geographic coordinates of the vehicle.

18 Claims, 3 Drawing Sheets

(56) References Cited

U.S. PATENT DOCUMENTS

| | | | | |
|---|---|---|---|---|
| 2005/0254669 | A1* | 11/2005 | Bose | G11B 20/10 381/105 |
| 2005/0273219 | A1* | 12/2005 | Kitao | B60R 25/00 701/2 |
| 2007/0040701 | A1 | 2/2007 | Browne et al. | |
| 2011/0241898 | A1 | 10/2011 | Busch | |
| 2012/0056758 | A1* | 3/2012 | Kuhlman | G08G 1/14 340/932.2 |
| 2012/0200430 | A1 | 8/2012 | Spahl | |
| 2013/0290045 | A1 | 10/2013 | Levy et al. | |
| 2013/0335239 | A1 | 12/2013 | Levy et al. | |
| 2014/0347196 | A1 | 11/2014 | Schulz et al. | |
| 2015/0029041 | A1 | 1/2015 | Liu et al. | |
| 2015/0161890 | A1 | 6/2015 | Huntzicker | |

OTHER PUBLICATIONS

GB Search Report dated Jan. 18, 2017 Issued for Corresponding UK Application No. GB1612661.7.

* cited by examiner

VACANT PARKING SPOT NOTIFICATION

TECHNICAL FIELD

The present disclosure relates to systems and methods for vacant parking spot notification using a wireless communication network.

BACKGROUND

Finding an available parking spot while driving a vehicle in a busy parking lot or a multi-level parking structure may be difficult and time-consuming. An operator of the arriving vehicle may not be aware that a departing vehicle located in a different row of the parking lot or on a different level of the parking structure is about to vacate a parking spot.

SUMMARY

A vacant parking spot notification system for a vehicle includes a controller programmed to, in response to receiving a user initiated signal indicative of the user's intent to cause a parked vehicle to vacate a parking spot and confirmation that operating parameters reflective of vehicle departure are present, broadcast geographic coordinates of the vehicle.

A vacant parking spot notification system for a vehicle includes a controller programmed to, in response to receiving a user initiated signal indicative of the user's intent to cause a parked vehicle to vacate a parking spot and confirmation that a change in vehicle odometer value exceeds a predetermined value, broadcast geographic coordinates of the vehicle.

A method for vacant parking spot notification in a vehicle includes, in response to receiving a user initiated signal indicative of the user's intent to cause a parked vehicle to vacate a parking spot and confirmation that operating parameters reflective of vehicle departure are present, broadcasting by a controller geographic coordinates of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a departing vehicle equipped with a vacant parking spot notification system, a wireless handheld transmitter may send a signal to the departing vehicle indicating that a parking spot it currently occupies is about to become available. The departing vehicle may confirm that the parking spot it previously occupied has been vacated. If the parking spot has been vacated, a geographic position of the parking spot is transmitted from the departing vehicle to an arriving vehicle. This may be the same as the geographic location of the departing vehicle at a time when the signal indicating that the parking spot that it currently occupies is about to become available is received by the departing vehicle. The transmission may, for example, take place directly after the determination of the parking spot that is about to become available, or the data can be stored and only transferred after a request to identify a vacant parking spot has been made by the arriving vehicle. The position may be determined by a satellite-based navigation system, such as a global positioning system (GPS).

The data regarding the available parking spot may be transmitted, for example by a wireless vehicle-to-vehicle (V2V) communication system, or, for example, by radio frequency (RF), wireless local access network (WLAN), Worldwide Interoperability for Microwave Access (Wimax), Bluetooth, short message service (SMS), or other information systems. The communication may take place directly from vehicle to vehicle or via other network users, for example infrastructure devices or control centers which collect data and, if appropriate, process the data and pass it onto an arriving vehicle. Additional data indicative of the location of the available parking spot, such as a parking structure level, lot, row, zone number, and so on, may also be transmitted.

Figure 1A:
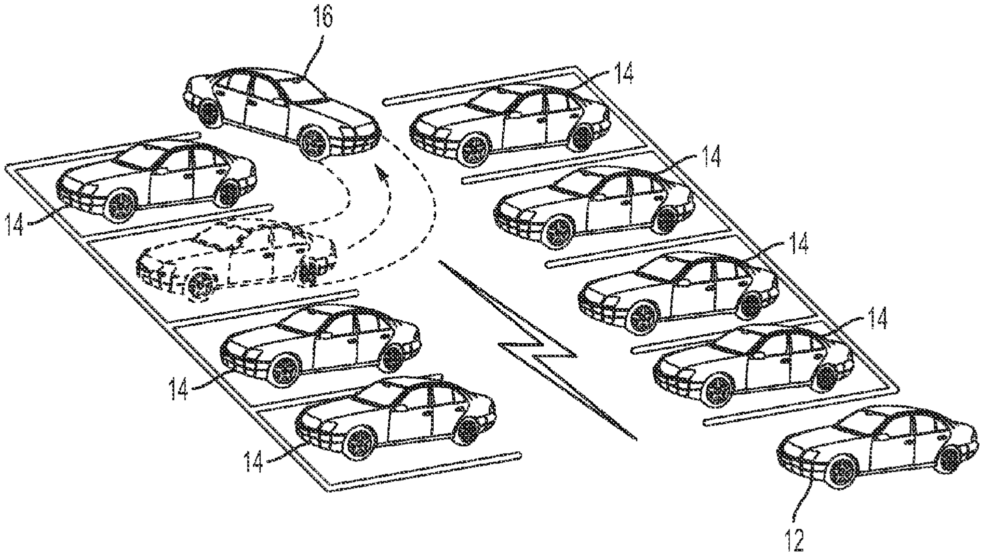
FIGS. 1A-1B are block diagrams illustrating a vacant parking spot notification system.
Figure 1B:
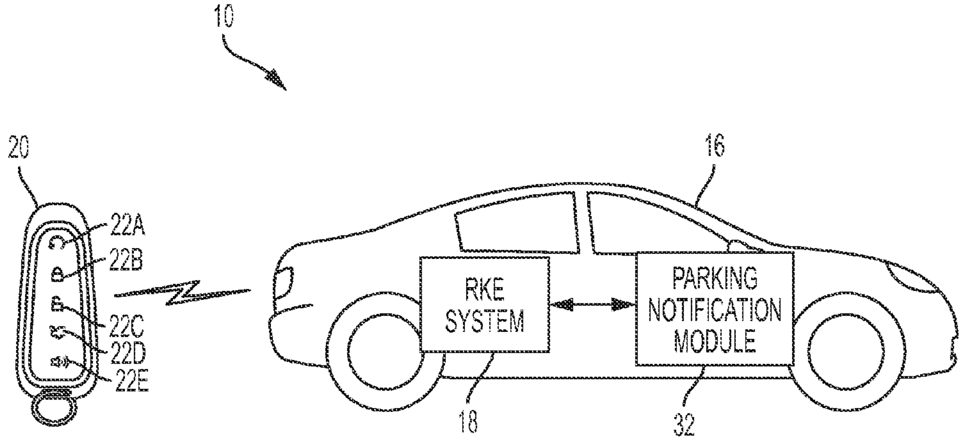

In reference to FIGS. 1A-1B, block diagrams illustrating a vacant parking spot notification system 10 are shown. An arriving vehicle 12 is a vehicle searching for a vacant parking spot among a plurality of parked vehicles 14 in a parking lot or a parking garage. A departing vehicle 16 sends a signal to the arriving vehicle 12 indicating a geographic position of an available parking spot. The geographic position of the available parking spot may correspond to a geographic location, e.g., GPS coordinates, of the departing vehicle 16 prior to, for example, a change in a state of one or more operating parameters of the departing vehicle 16, such as, but not limited to, odometer value, transmission gear selection, ignition ON/OFF state, vehicle speed, change in a geographic location after a predetermined period of time and so on.

In reference to FIG. 1B, the vacant parking spot notification system 10 includes the departing vehicle 16 equipped with a remote keyless entry (RKE) system 18 configured to communicate with a wireless handheld transmitter, hereinafter a key fob 20. The key fob 20 is configured to send a signal to the RKE system 18 indicating that a parking spot currently occupied by the departing vehicle 16 is about to become available. The RKE system 18 is in communication with a parking notification module 32 configured to, in response to receiving a signal indicating that the currently occupied parking spot is about to become available, broadcast a geographic position of the recently vacated parking spot to the arriving vehicle 12. While the key fob 20 is described as being in communication with the RKE system 18, communication with various other vehicle control modules and systems, such as an RF receiver, a passive anti-theft system, and an immobilizer system, is also contemplated.

In another example, the departing vehicle 16 may instead be equipped with a dedicated parking spot notification button (not shown), e.g., on a dashboard, configured to transmit a signal to an appropriate vehicle control module (not shown) of the departing vehicle 16 indicating that the parking spot it currently occupies is about to become available. In yet another example, the dedicated parking spot notification button may be a soft button on a touch-sensitive display of the departing vehicle 16. In an example, a user of the departing vehicle 16 may activate the dedicated parking spot notification button or the soft button at a time when they are preparing to vacate the parking spot.

As will be described in further detail in reference to FIG. 2, the key fob 20 may be a pocket-sized fob capable of operating different ignition cycles of a vehicle and locking/unlocking doors through a transponder or a mechanical key. In one example, the key fob 20 may be an RF transmitter that is capable of broadcasting at a predefined frequency, e.g., 315 MHz, with a predefined communication protocol. The broadcast signals may be coded or encrypted in order to identify the broadcast signal with the particular vehicle and particular vehicle function being controlled.

The key fob 20 is equipped with one or more pushbuttons 22A-E that send encoded RF signals to the RKE system 18 requesting various functions that include, but are not limited to, lock, unlock, trunk control, panic alarm activation and deactivation, and remote start. For example, lock and unlock buttons 22B, 22C, respectively, may allow a vehicle to be locked and unlocked. A trunk button 22D may allow a vehicle trunk to be locked and unlocked and a panic button 22E may allow a user to activate the vehicle horn and/or headlights.

The RKE system 18 may be in communication with a vehicle computing system (VCS) (not shown) and/or body control module (BCM) (not shown) via a multiplexed data link communication bus, such as a High/Medium Speed Controller Area Network (CAN) bus, a Local Interconnect Network (LIN), or any such suitable data link communication bus generally situated to facilitate data transfer between control modules in a vehicle. The RKE system 18, in response to receiving a request for a given vehicle function, e.g., a request to unlock vehicle doors, may transmit a command to the VCS and/or the BCM to fulfill that function.

Figure 2:
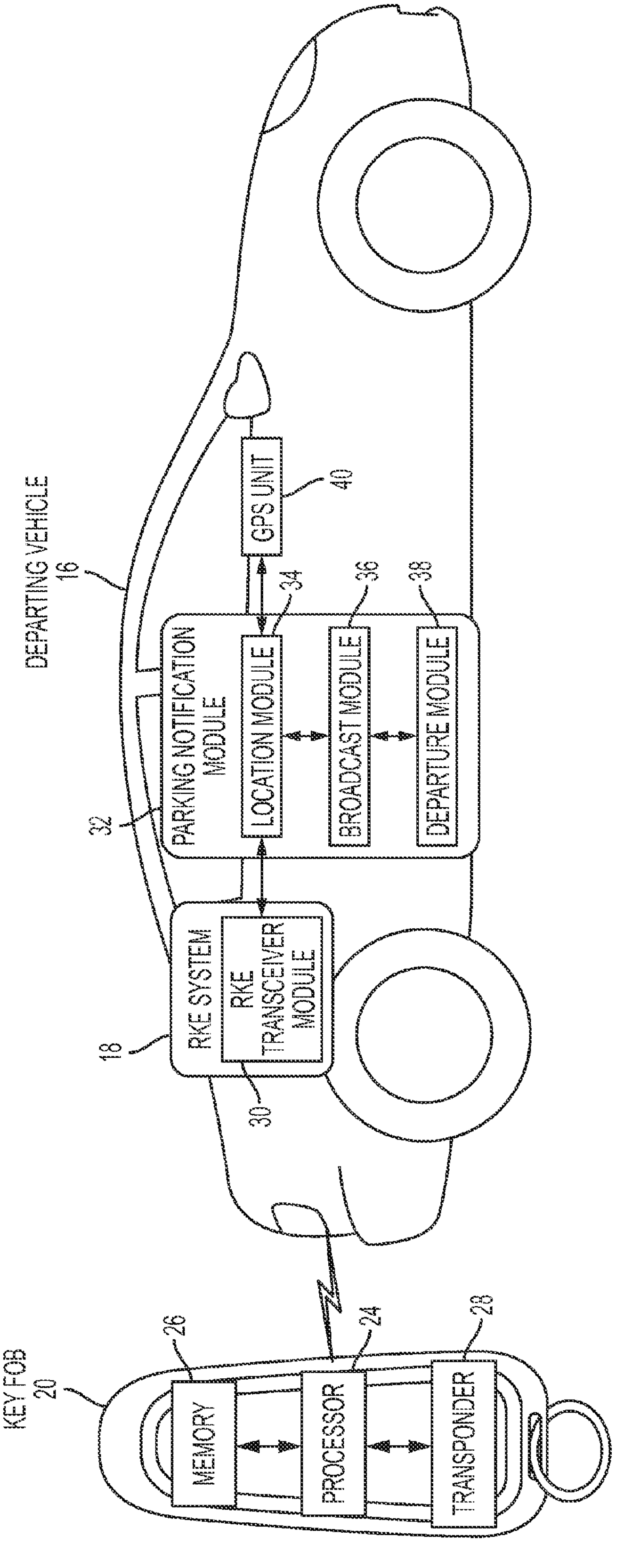
FIG. 2 is a block diagram illustrating a vehicle configured to perform vacant parking spot notification using wireless communication.

In reference to FIG. 2, a vehicle equipped with the vacant parking spot notification system 10 is shown. The key fob 20 may include, but is not limited to, a processor 24, a memory 26, and a transponder 28. Different hardware configurations may exist for the key fob 20. In one example, the key fob 20 may further include one or more fob transceivers (not shown). The fob transceivers may be used to communicate with a vehicle computing system, telematics unit, instrument cluster, or any other module. The transceivers may be configured to communicate via wired and wireless links. Wireless links may include, but are not limited to, Bluetooth, RF, Wi-Fi, near field communication (NFC), etc. Wired links may include, but are not limited to, Universal Serial Bus (USB), Firewire, Serial, etc. Transponders may combine functionality with transceivers. Processor and memory may also be reconfigured to be in series or parallel communication with the transceivers.

The processor 24 may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein, such as, but not limited to, a system functionality check. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The memory 26 may be connected with the processor 24 or embedded as part of the processor 24. This memory may be used for storing the various information or data used in the determinative or selective processes, as discussed in greater detail below. The memory may also be used for storing instructions of a system functionality check, passive anti-theft unique identifiers, and unique identification flags, such as those utilized in Ford's MyKey system. The memory can be both persistent and non-persistent. Memory can include random access memory (RAM), such as but not limited to, DRAM, SRAM, T-RAM, Z-RAM, TTRAM, etc. The memory may also include read only memory, such as but not limited to, PROM, EPROM, EEPROM, etc.

The transponder 28 may communicate with the departing vehicle 16 in coordination with the pushbuttons 22A-E of the key fob 20 to, for example, lock/unlock doors, activate different ignition cycles, activate trunk release, and validate custom setting features, similar to Ford's MyKey. The transponder 28 is in communication with a remote keyless entry (RKE) transceiver module 30 of the RKE system 18. The transponder 28 may be used in conjunction with a vehicle packaged with a keyless ignition system, such as but not limited to a push-start system, or a classic ignition switch that uses a mechanical key, or any other suitable alternative.

In one example, the transponder 28 may communicate with a passive anti-theft system to allow remote keyless entry when in close proximity with a vehicle's transmitter (not shown). The vehicle transmitter may generate a radio signal detectable by the transponder 28 when it is in close proximity to the departing vehicle 16. If the transponder 28 replies with a valid code, the passive anti-theft system will allow access control of the departing vehicle 16, such as but not limited to, locking and unlocking vehicle doors. Additionally, the valid code may allow operational control of the departing vehicle 16, such as, but not limited to, allowing the engine to be started. If an invalid code is sent, the access and operational control of the departing vehicle 16 may not be allowed.

The transponder 28 of the key fob 20 may also be an active transponder powered by a built-in energy source, such as a battery. The key fob may or may not include a mechanical key to operate the vehicle ignition. Additionally, the key fob 20 may or may not have passive remote keyless entry. Alternative embodiments of the key fob 20 may include various combinations that may or may not include a mechanical key, passive remote keyless entry, or both. In another alternative, a transmitter or transceiver may be used in place of a transponder.

As described previously, the key fob 20 may be in communication with the RKE transceiver module 30 of the RKE system 18. In one example, the RKE transceiver module 30 may include a short-range wireless transmitter/receiver (not shown) that is capable of transmitting and receiving short-range signals to and from the key fob 20 that is typically carried by a vehicle user. The RKE transceiver module 30 may be further configured to compare a unique identifier sent from the key fob 20 to ensure secure wireless operation between the departing vehicle 16 and the key fob 20 or any other suitable means of identification. In one example, the key fob 20 may further be in communication with other vehicle control modules and systems, such as a passive anti-theft system, to ensure secure wireless operation between the departing vehicle 16 and the key fob 20.

The RKE transceiver module 30 may communicate with the VCS and/or (BCM) configured to store a variety of functions that can be invoked by a plurality of pushbuttons 22A-E of the key fob 20. In one example, the BCM may unlock the doors, in response to receiving a request to unlock the doors from the RKE transceiver module 30. A combination of and/or sequential selection of the commanding pushbuttons on the key fob 20 may allow for additional functions. For example, if a user presses the unlock pushbutton 22C, the driver door will unlock, and if the user presses the unlock pushbutton 22C twice, all the doors on the vehicle will unlock. Another example of a user combining inputs of the key fob pushbuttons to achieve additional commanding vehicle functions includes, but is not limited to, pressing the lock pushbutton 22B twice within a predetermined period to hear an audible verification that the doors on the vehicle are locked.

In one example, at least one pushbutton of the key fob 20 may be configured to perform a first function, e.g., panic, when vehicle ignition is off and to perform a second function, e.g., parking spot availability notification, when vehicle ignition is on. The varying functionality of the at least one pushbutton of the key fob 20 may depend on a state of various operating parameters of the departing vehicle 16, such as, but not limited to, odometer value, transmission gear selection, ignition ON/OFF state, vehicle speed, change in a vehicle geographic location and so on.

The RKE transceiver module 30 is in communication with a parking notification module 32. The parking notification module 32 includes a location module 34, a broadcast module 36, and a departure module 38. While various separate controllers are illustrated, it should be understood that any configuration of control modules should be considered within the scope of the present disclosure. References to a "controller" or "at least one controller" hereinafter are intended to refer to at least one of the location module 34, broadcast module 36, and departure module 38, or any combination thereof. In one example, the key fob 20 may be in communication with the VCS of the departing vehicle 16 and may house one or more of the various separate controllers.

The location module 34 receives a signal from the RKE transceiver module 30 indicating that the departing vehicle 16 is about to leave its current geographic location. The location module 34 determines the current geographic location of the departing vehicle 16. For example, the departing vehicle 16 may be equipped with a GPS unit 40 in communication with the location module 34. The GPS unit 40 is configured to detect and capture GPS coordinates of the departing vehicle 16. The GPS unit 40, in response to a request from the location module 34, provides the current geographic location, e.g., GPS coordinates, of the departing vehicle 16 to the location module 34. In one example, the GPS unit 40 is incorporated as part of a navigation system of the departing vehicle 16.

The location module 34 is in communication with the broadcast module 36. The broadcast module 36 receives a geographic position, e.g., GPS coordinates, of the available parking spot and broadcasts it via a communication network. The geographic position of the available parking spot may correspond to the geographic location of the departing vehicle 16 at a time the location module 34 sent a request to the GPS unit 40 to determine the geographic location of the departing vehicle 16. The broadcast module 36 may use a V2V network to transmit the geographic position of the available parking spot to the arriving vehicle 12. In another example, the broadcast module 36 may transmit the geographic position of the available parking spot via a wireless network to a central station (not shown) for further distribution to one or more vehicles looking for a vacant parking spot. In one example, the broadcast module 36 may broadcast additional data related to the available parking spot, such as a parking structure level, lot, row, zone number and so on.

The broadcast module 36 is in communication with the departure module 38. Prior to broadcasting the geographic position of the available parking spot, the broadcast module 36 may send a request to the departure module 38 to confirm that the departing vehicle 16 left the current geographic location. The departure module 38 determines whether the departing vehicle 16 left the current geographic location by analyzing one or more departure indicators, i.e., operating parameters reflective of vehicle departure. For example, the departure module 38 may be in communication with one or more systems and modules (not shown) of the departing vehicle 16, such as a body control module (BCM), a navigation system, a telematics system, instrument panel cluster (IPC), steering column control module (SCCM), a transmission control module (TCM), engine control module (ECM), braking system control module (BSCM), and so on, and may request information related to one or more operating parameters of the departing vehicle 16. The operating parameters may include, but are not limited to, odometer value, ignition ON/OFF state, transmission gear selection state, brake pedal and brake pedal position state, vehicle speed, acceleration, vehicle geographic location, engine temperature, and so on.

In another example, the departure module 38 may receive information related to one or more operating parameters of the departing vehicle 16 from one or more sensors (not shown), such as an accelerator pedal position sensor (APPS), brake pedal and brake pedal position sensor (BPPS), a gear selector that communicates a gear selection (PRNDL) signal, engine temperature sensor, G-sensor, and so on. The input signals may be communicated from the vehicle system components themselves, or device-specific controllers, or may be received from various vehicle system sensors, antennas, or manual inputs, such as those described above.

The departure module 38 determines whether the departing vehicle 16 left the current geographic location by analyzing one or more of the received input signals. In one example, the departure module 38 determines that the departing vehicle 16 left the current geographic location in response to receiving one or more input signals indicating that vehicle odometer value change exceeds a predetermined value. In another example, the departure module 38 determines that the departing vehicle 16 left the current geographic location in response to receiving one or more input signals indicating that transmission gear selection changed from a first predetermined value to a second predetermined value, e.g., from parked gear (P) to reverse gear (R). In yet another example, the departure module 38 determines that the departing vehicle 16 left the current geographic location in response to receiving one or more input signals indicating that a new geographic location of the departing vehicle 16 differs from a previously captured geographic location by a predetermined value.

In still another example, the departure module 38 determines that the departing vehicle 16 left the current geographic location in response to receiving input signals indicating a change in odometer value, gear selection, or vehicle location within a predetermined period. For example, the departure module 38 may start a countdown timer at a time when it receives a request for a confirmation that the departing vehicle 16 left the current geographic location. The departure module 38 may send a signal to the broadcast module 36 indicating that the departing vehicle 16 did not leave the current geographic location, in response to the countdown timer expiring before the departure module 38 receives one or more input signals confirming that the departing vehicle 16 vacated the parking spot.

The departure module 38 may send a signal to the broadcast module 36 confirming that the departing vehicle 16 left the current geographic location in response to receiving input signals confirming that the departing vehicle 16 vacated the parking spot before the expiration of the countdown timer. The broadcast module 36 broadcasts geographic position, e.g., GPS coordinates, of the vacant parking spot, in response to receiving a signal from the departure module 38 confirming that the departing vehicle 16 vacated the parking spot. The geographic position may correspond to the geographic location of the departing vehicle 16 at a time the location module 34 sent a request to the GPS unit 40 to determine the geographic location of the departing vehicle 16.

In an example, the broadcast module 36 may transmit the geographic position of the vacant parking spot to the arriving vehicle 12 use a V2V network or transmit the geographic position of the vacant parking spot via a wireless network to a central station for further distribution to one or more vehicles looking for a vacant parking spot. The broadcast module 36 may be further configured to broadcast data indicative of the geographic position of the available parking spot, such as, but not limited to, a parking structure level, lot, row, zone number, and so on. In another example, the broadcast module 36 may stop broadcasting the geographic position, e.g., GPS coordinates, of the available parking spot after a predetermined period.

Figure 3:
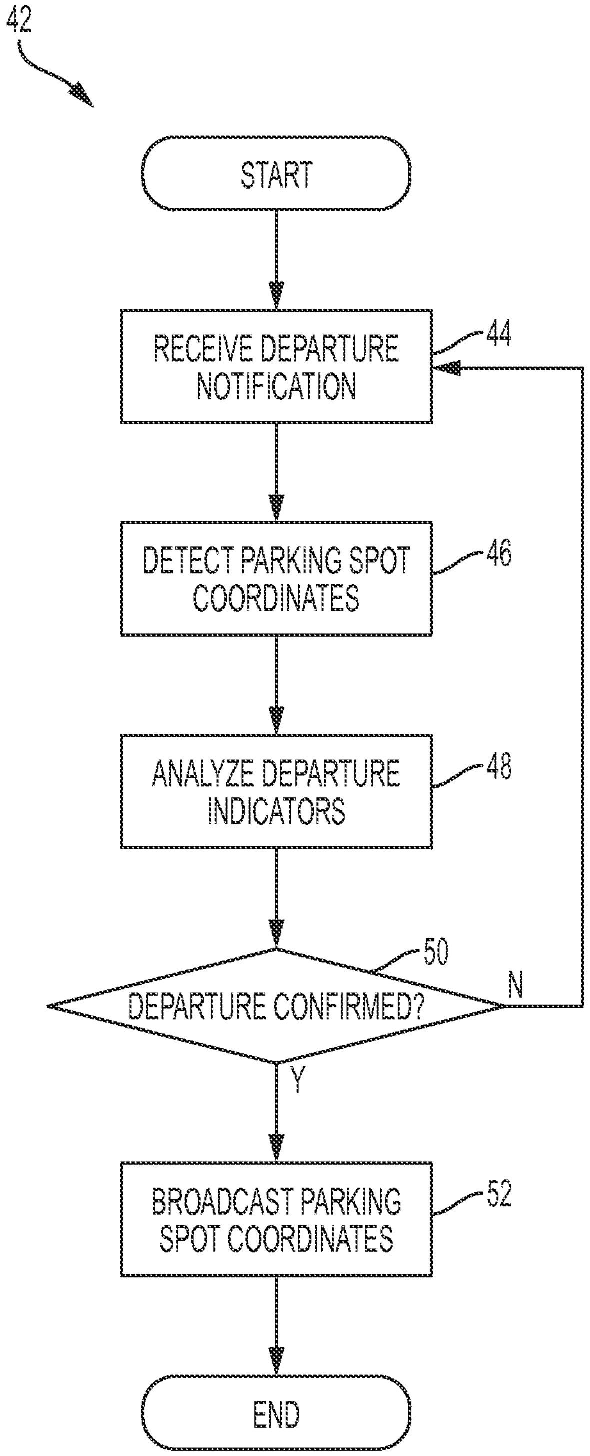
FIG. 3 is a flowchart illustrating an algorithm for performing vacant parking spot notification using wireless communication.

In reference to FIG. 3, a control strategy 42 for providing a vacant parking spot notification using wireless communication is shown. The control strategy 42 may begin at block 44 where the parking notification module 32 of the departing vehicle 16 receives a signal indicating that the departing vehicle 16 is about to leave the geographic location it currently occupies. For example, the location module 34 of the parking notification module 32 may receive a signal from the RKE transceiver module 30 indicating that the departing vehicle 16 is about to leave the current geographic location.

The parking notification module 32 detects the current geographic coordinates at block 46, in response to receiving a signal indicating that the departing vehicle 16 is about to leave the geographic location it currently occupies. For example, the location module 34 in communication with the GPS unit 40 may request the current GPS coordinates of the departing vehicle 16. The location module 34 may then selectively forward the current geographic location to the broadcast module 36.

At block 48 the parking notification module 32 analyzes one or more departure indicators, i.e., vehicle operating parameters that may be indicative of the departing vehicle 16 having vacated its current geographic location. For example, the departure module 38 in communication with a plurality of systems, modules, and sensors of the departing vehicle 16 may receive information related to one or more operating parameters of the departing vehicle 16. The operating parameters may include, but are not limited to, odometer value, transmission gear selection, ignition ON/OFF state, brake pedal and brake pedal position state, vehicle speed, acceleration, vehicle geographic location, engine temperature, and sensor inputs, such as the APPS, BPPS, gear selector that communicates a gear selection (PRNDL) signal, engine temperature sensor, G-sensor, and so on.

The parking notification module 32 determines at block 50 whether the departing vehicle 16 vacated the current geographic location. For example, the departure module 38 may determine that the departing vehicle 16 left the current geographic location in response to receiving input signals indicating one or more of the following operating parameters: a new odometer value of the departing vehicle 16 differs from a previous a previously captured odometer value by a predetermined value, a transmission gear state changed from a first predetermined gear state to a second predetermined gear state, a new geographic location of the departing vehicle 16 differs from the previously captured geographic location by a predetermined distance, and so on.

In another example, the departure module 38 determines that the departing vehicle 16 left the current geographic location in response to receiving input signals indicating a change in vehicle odometer value, transmission gear, vehicle location or vehicle speed within a predetermined period. In such an example, the departure module 38 determines that the departing vehicle 16 did not leave the current geographic location in response to failing to receive input signals indicating a change in vehicle odometer value, transmission gear, vehicle location or vehicle speed within a predetermined period. The control strategy 42 returns to block 44 in response to the departure module 38 sending a signal to the broadcast module 36 indicating that the departing vehicle 16 did not leave the current geographic location.

At block 52 the parking notification module 32 broadcasts a geographic position, e.g., GPS coordinates, of the available parking spot in response to confirming that the departing vehicle 16 vacated the parking spot. The geographic position may correspond to the geographic location of the departing vehicle 16 at a time the location module 34 sent a request to the GPS unit 40 to determine the geographic location of the departing vehicle 16. For example, the broadcast module 36 of the parking notification module 32 may transmit the geographic position of the vacant parking spot to the arriving vehicle 12 using a V2V network or transmit the current geographic location of the departing vehicle 16 via a wireless network to a central station for further distribution to one or more vehicles looking for a vacant parking spot.

The broadcast module 36 may further broadcast data related to geographic position of the available parking spot, such as, but not limited to, a parking structure level, lot, row, zone number and so on. In one example, the broadcast module 36 may stop broadcasting the geographic position, e.g., GPS coordinates, of the available parking spot after a predetermined period. At this point the control strategy 42 may end. In some embodiments the control strategy 42 described in FIG. 3 may be repeated in response to receiving a signal indicating that the departing vehicle 16 is about to leave the current geographic location or in response to receiving another signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A notification system for a vehicle comprising:

an in-vehicle controller programmed to, in response to both (i) receiving a user initiated signal that originates from a wireless handheld transmitter and is indicative of the user's intent to cause a parked vehicle to vacate a parking spot and (ii) confirming that a difference between geographic coordinates of the vehicle captured after the receiving and current geographic coordinates is greater than a threshold, broadcast the captured coordinates.

2. The system of claim 1, wherein the wireless handheld transmitter includes a pressure-sensitive switch having a first function controlling at least one vehicle function and a second function initiating the signal, to the in-vehicle controller, indicative of the user's intent to cause the parked vehicle to vacate the parking spot, the second function enabled following a change in operating parameters.

3. The system of claim 1, wherein the user initiated signal indicative of the user's intent to cause the parked vehicle to vacate the parking spot originates from a dedicated vacant parking spot notification button.

4. The system of claim 1, wherein the controller is further programmed to broadcast geographic coordinates of the vehicle, in response to receiving the user initiated signal indicative of the user's intent to cause the parked vehicle to vacate the parking spot and confirmation that operating parameters reflective of vehicle departure are present within a predetermined period of receiving the user initiated signal.

5. The system of claim 1, wherein operating parameters reflective of vehicle departure include a change in at least one of odometer value, and transmission gear selection.

6. The system of claim 5, wherein the operating parameters reflective of the vehicle departure include a change within a predetermined period in at least one of odometer value, transmission gear selection, and the geographic coordinates.

7. The system of claim 1, wherein the controller is further configured to stop broadcasting the geographic coordinates after a predetermined period.

8. A vacant parking spot notification system for a vehicle comprising:

an in-vehicle controller programmed to, in response to receiving a user initiated signal that originates from a wireless handheld transmitter and is indicative of the user's intent to cause a parked vehicle to vacate a parking spot, capture geographic coordinates of the parked vehicle, confirm that a change between the captured coordinates and current geographic coordinates of the vehicle exceeds a predetermined value, and broadcast the captured coordinates.

9. The system of claim 8, wherein the controller is further programmed to broadcast geographic coordinates of the vehicle, in response to receiving the user initiated signal indicative of the user's intent to cause the parked vehicle to vacate the parking spot and confirmation within a predetermined period that the change in the vehicle odometer value exceeds a predetermined value.

10. The system of claim 8, wherein the controller is further programmed to broadcast geographic coordinates of the vehicle, in response to receiving the user initiated signal indicative of the user's intent to cause the parked vehicle to vacate the parking spot and confirmation within a predetermined period that transmission gear selection changed from a first predetermined value to a second predetermined value.

11. The system of claim 8, wherein the controller is further programmed to stop broadcasting geographic coordinates of the vehicle after a predetermined period.

12. A method for vacant parking spot notification in a vehicle comprising:

receiving a user initiated signal that originates from a wireless handheld transmitter and is indicative of the user's intent to cause a parked vehicle to vacate a parking spot, capturing geographic coordinates of the vehicle, confirming that operating parameters reflective of vehicle departure are present by detecting that a change between the captured coordinates and current geographic coordinates is greater than a predetermined value, and broadcasting, by an in-vehicle controller, the captured geographic coordinates.

13. The method of claim 12, wherein the wireless handheld transmitter includes a pressure-sensitive switch having a first function controlling at least one vehicle function and a second function initiating the signal, to the in-vehicle controller, indicative of the user's intent to cause the parked vehicle to vacate the parking spot, the second function enabled following a change in the operating parameters.

14. The method of claim 12, wherein the user initiated signal indicative of the user's intent to cause the parked vehicle to vacate the parking spot originates from a dedicated vacant parking spot notification button.

15. The method of claim 12, further comprising broadcasting geographic coordinates of the vehicle, in response to receiving the user initiated signal indicative of the user's intent to cause the parked vehicle to vacate the parking spot and confirmation that operating parameters reflective of vehicle departure are present within a predetermined period of receiving the user initiated signal.

16. The method of claim 12, wherein the operating parameters reflective of the vehicle departure include a change in at least one of odometer value, transmission gear selection, and the geographic coordinates.

17. The method of claim 16, wherein the operating parameters reflective of the vehicle departure include a change within a predetermined period in at least one of odometer value, transmission gear selection, and the geographic coordinates.

18. The method of claim 12, further comprising stopping the broadcasting of the geographic coordinates after a predetermined period.

* * * * *